United States Patent [19]

Rathbun et al.

[11] 4,164,334
[45] Aug. 14, 1979

[54] TAPE MEASURE HOOK AND HOOK STORAGE RECEPTACLE

[75] Inventors: Richard H. Rathbun, Oakdale; William J. Hildebrandt, Simsbury, both of Conn.

[73] Assignee: The Stanley Works, New Britain, Conn.

[21] Appl. No.: 869,841

[22] Filed: Jan. 16, 1978

[51] Int. Cl.$^2$ .............................................. G01B 3/10
[52] U.S. Cl. ..................................... 242/84.8; 33/138
[58] Field of Search ................ 242/84.8, 107.3, 107.2, 242/107.6, 107.12; 33/138, 137 R

[56] References Cited
U.S. PATENT DOCUMENTS

| 1,100,325 | 6/1914 | Pronovost | 33/137 R |
| 3,141,628 | 7/1964 | Evans et al. | 242/84.8 |
| 3,611,576 | 10/1971 | Quenot | 33/137 R |

Primary Examiner—Harvey C. Hornsby
Assistant Examiner—John M. Jillions
Attorney, Agent, or Firm—Prutzman, Kalb, Chilton Alix

[57] ABSTRACT

A tape measure having a molded plastic hook with a hook member pivotally mounted on a base member between a folded detented position underlying the base member and an unfolded detented position perpendicular to the base member, and a casing with a hook storage compartment for protectively storing the hook in a folded condition within the profile of the casing and having side slots for manually grasping and withdrawing the hook.

8 Claims, 7 Drawing Figures

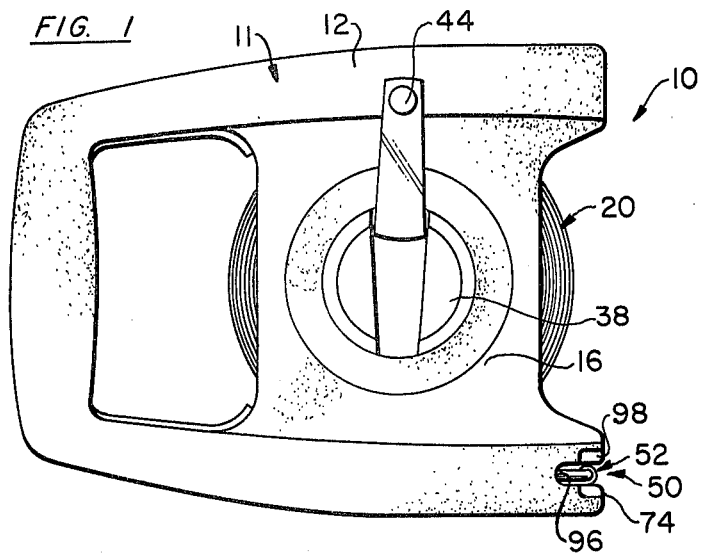
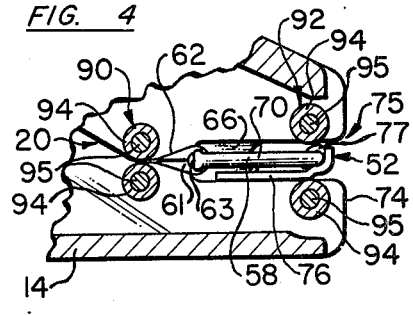
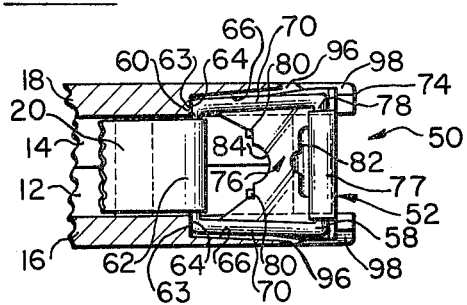
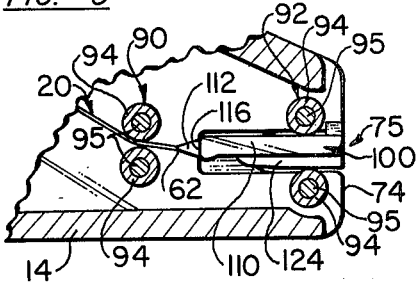
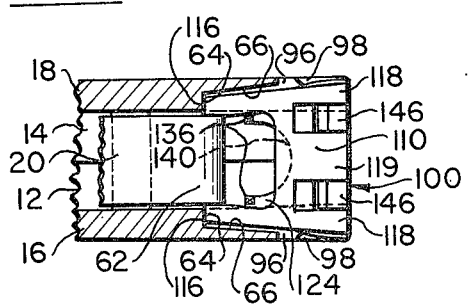
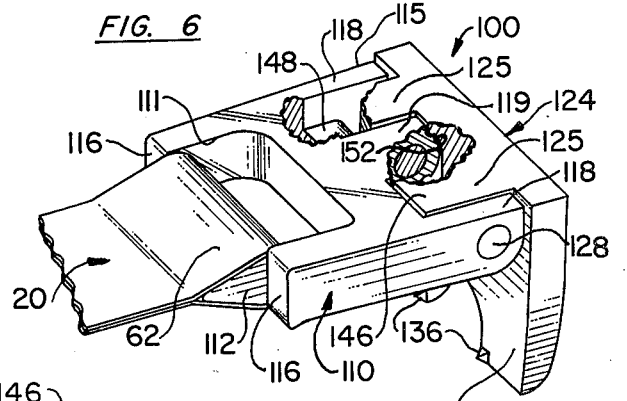
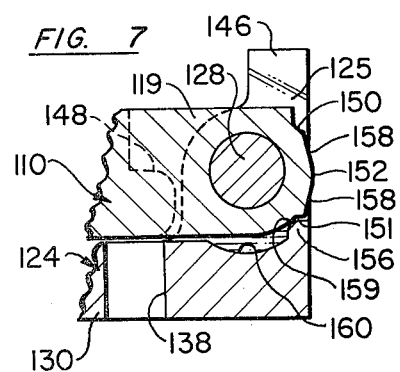

TAPE MEASURE HOOK AND HOOK STORAGE RECEPTACLE

BRIEF SUMMARY OF THE INVENTION

The present invention relates generally to tape measures, and more particularly to a tape measure having a new and improved measuring tape hook and hook storage receptacle.

It is a principal aim of the present invention to provide a tape measure having a new and improved storage arrangement for automatically storing the measuring tape hook within the profile of the tape casing when the tape blade is fully retracted, for preventing accidentally catching the hook and minimize the likelihood of inadvertent withdrawal thereof and yet permit the hook to be readily manually grasped for withdrawing the tape blade as desired.

It is another aim of the present invention to provide a tape measure having a new and improved hook storage arrangement for protectively storing a two-part tape hook of the type having a generally flat base member connected to the outer free end of the tape blade and a hook member pivotally mounted on the outer end of the base member between a folded or closed position underlying the base member and an unfolded or open position extending generally perpendicular to the base member. In accordance with the present invention, the hook storage arrangement provides for storing the hook in a folded condition and with the folded hook substantially fully protected against inadvertent withdrawal.

It is a further aim of the present invention to provide in an all plastic electrically non-conductive tape measure, a new and improved two-part molded plastic hook of the type described.

It is another aim of the present invention to provide a two-part molded plastic hook having a new and improved detent device for detenting the hook member in its folded and unfolded positions.

It is a still further aim of the present invention to provide in a tape measure of the type having a plastic measuring tape blade and a plastic hook, a new and improved hook storage receptacle for protectively storing the plastic hook in its folded condition free and clear of possible damage and from being inadvertently caught for example when carrying the tape measure in a rear pocket.

Other objects will be in part obvious and in part pointed out more in detail hereinafter.

A better understanding of the invention will be obtained from the following detailed description and the accompanying drawing of illustrative applications of the invention.

BRIEF DESCRIPTION OF THE DRAWING

In the drawing:

FIG. 1 is a side view of a tape measure incorporating an embodiment of the present invention;

FIG. 2 and 3 are similar enlarged partial transverse section views, partly broken away and partly in section, of the tape measure of FIG. 1 and of a modified tape measure;

FIGS. 4 and 5 are similar enlarged partial side section views, partly broken away and partly in section, of the tape measures shown in FIGS. 2 and 3 respectively;

FIG. 6 is an enlarged partial perspective view, partly broken away and partly in section, showing a molded plastic hook of the tape measure of FIGS. 3 and 5 unfolded; and FIG. 7 is an enlarged partial section view, partly broken away and partly in section, showing the molded plastic hook of FIG. 6 folded.

DESCRIPTION OF THE PREFERRED EMBODIMENTS

Referring now to the drawing in greater detail wherein like reference numerals indicate like parts throughout the several figures, there is shown a tape measure 10 incorporating an embodiment of the present invention having a casing 11 consisting of a pair of mating molded plastic side members 12, 14 which, in their assembled condition, define an intermediate tape storage cavity, open at its front and rear ends, for storing a plastic measuring tape blade 20 which, for example, may be 50 feet long or more.

A molded plastic measuring tape reel 38 is rotatably mounted to extend between opposed laterally spaced sidewalls 16, 18 of the side members 12, 14 for reeling in and storing the measuring tape 20 in its storage cavity. The reel 38 has a pivotal molded plastic crank 44 for rotating the reel and rewinding the measuring tape 20 onto the reel in a generally conventional manner.

In accordance with the present invention, a new and improved measuring tape delivery throat structure 50 is provided at the lower front end of the casing 11 for uncoiling the measuring tape blade from and coiling it on the reel 38 and for storing an enlarged measuring tape end grip or hook 52 when the tape measure 10 is not in use.

The enlarged hook 52 shown in FIGS. 1, 2 and 4 has two parts of generally conventional design but which is modified in accordance with the present invention for receipt and storage within the throat structure 50 (as shown in FIGS. 2 and 4). The enlarged end hook 52 comprises a generally rectangular wire base member or ring 58 having an inner transverse bar 60. A generally teardrop shaped ferrule 61 is assembled on the bar 60 for tightly receiving an outer end loop 62 of the plastic measuring tape blade 20. The lateral ends of the cross bar 60 which extend outwardly of the tape blade 20 are formed to provide inwardly facing coplanar abutment surfaces or shoulders 63 to provide enlarged flat abutment surfaces perpendicular to the axis of the tape blade adapted to seat against corresponding perpendicular flat outwardly facing coplanar abutment surfaces or shoulders 64 formed at the inner ends of opposed recessed channels 66 of casing sidewalls 16, 18. The casing sidewalls 16, 18 are molded so that the channels 66 incline or taper inwardly toward each other to the inner abutment shoulders 64. The sides 70 of the wire ring 58 are similarly inclined or tapered inwardly toward each other in conformity with the channels 66 so that the ring 58 is adapted to be guided into and retained within the opposed channels 66 and located centrally between the opposed parallel casing sidewalls 16, 18. The ring 58 is dimensioned so that it is free to shift slightly laterally within the opposed channels 66 and yet so that both of its inwardly facing abutments 63 remain firmly in engagement with abutment shoulders 64. Also, the mating coplanar abutments 63, 64 provide for retaining the ring 58 in its storage receptacle without forcing the molded side members 12, 14 apart even under substantial tape tension manually applied via the reel crank 44. Further, as seen in the drawing, the entire enlarged end hook 52 is stored within the profile of the lower front edge face 74 of the tape measure casing 11 and the narrow tape delivery opening or mouth 75 between the sidewalls 16, 18 and therefore clear of being inadvertently caught or snagged when the tape measure is not in use.

The end hook 52 of FIGS. 1, 2 and 4 also comprises a generally V-shaped metal hook member 76 having a rolled knuckle 77 for pivotally mounting the hook member 76 on an outer cross bar 78 of the wire ring 58. The hook member 76 is thereby made pivotal between a folded or closed position underlying the ring 58 for receipt within the opposed storage receptacle channels 66 and an open or unfolded position generally perpendicular to the ring 58 for hooking the tape to an upright nail or on the end of a board, etc. Also, the hook member 76 is formed with (a) prongs or spurs 80 for catching the edge shoulder of a board, etc., (b) a lateral slot 82 for receiving the head of a locating nail against which the hook member 76, when unfolded, is positioned to abut, and (c) a circular pocket 84 for engaging the shank of a locating nail against which the hook member 76 is positioned to abut. Also, the metal hook member 76 is laterally tapered so that, when folded, it is adapted to be received within the opposed storage receptacle channels 66 and yet completely underlie and be within the lateral confines of the tapered ring 58.

Inner and outer pairs 90, 92 of opposed spaced guide rolls 94 are provided for guiding the tape blade 20 and folded hook 52. The guide rolls 94 are mounted on opposed, laterally extending integrally molded support pins 95 of the side members 12, 14. The inner pair 90 of guide rolls 94 is located inwardly of the channels 66 for guiding the tape 20 along a path of travel in alignment with the hook storage receptacle. The outer pair 92 of guide rolls 94 is located slightly inwardly of the mount 75 of the delivery throat 50 for guiding the enlarged hook 52 into and out of its storage receptacle.

Referring particularly to FIGS. 1 and 2, the opposed parallel sidewalls 16, 18 are formed with opposed parallel slots 96 at the outer end of the channels 66 and extending to the delivery throat opening or mouth 75. The sidewalls 16, 18 are also formed with pockets or relieved portions 98 at the outer ends of the slots 96 and with pocket portions of opposite sides of the slots 96. The slots 96 and pockets 98 are provided to facilitate manually gripping and withdrawing the enlarged end hook 52 from its storage receptacle so that even though the enlarged end hook is stored in a fully protective condition fully enclosed above and below the hook 52, the hook 52 can be readily manually withdrawn from storage for using the tape measure.

Referring now in FIGS. 3 and 5-7, a modified embodiment of a tape measure of the present invention is shown which employs an enlarged molded plastic end grip or hook 100 in lieu of the metal hook 52 as shown in FIGS. 1, 2 and 4. Such a molded plastic hook 100 is particularly useful with plastic measuring tapes 20 for example where an electrically non-conductive tape measure is desired. The tape measure may be otherwise substantially the same as that described with respect to FIGS. 1, 2 and 4.

The molded plastic hook 100 comprises a molded plastic generally flat base member 110 with an inner D-shaped section 111 with an integral cross bar 112 receiving the outer end loop 62 of the plastic measuring tape blade 20. The cross bar 112 has an integral rearwardly projecting teardrop shape, and the tape end look 62 is preferably dimensioned to tightly receive the teardrop cross bar. The end loop 62 is formed for example by threading a free end of the plastic tape blade 20 around the cross bar 112 and folding and sealing it to the underside of the tape blade 20. Also, the inner D-shaped section 111 has flat inwardly facing coplanar end shoulders 116 laterally outwardly of the cross bar 112 and disposed perpendicularly to the path of travel of the tape blade 20 for abutting the corresponding outwardly facing coplanar shoulders 64 of the casing 11 for the purpose described with respect to the embodiment of FIGS. 1, 2 and 4.

The base member 110 has an outer hinge section 115 with three laterally spaced outwardly projecting hinge knuckles 118, 119. An L-shaped hook member 124 of the hook 100 has an upstanding hinge section with a pair of upstanding hinge knuckles 125 interfitting between the three hinge knuckles 118, 119 of the base member 110. The hinge knuckles 118, 119 and 125 have aligned apertures receiving a plastic hinge pin 128 for pivoting the hook member 124 between an open or unfolded position shown in FIG. 6 and a folded position shown in FIGS. 3, 5 and 7. A generally flat V-shaped hook section 130 of the hook member 124 is thereby adapted to be pivoted between an unfolded or open position extending generally perpendicular to the base member 110 and a folded position underlying the base member 110. The sides of the base member 110 and hook section 130 are inwardly tapered for receipt within the inwardly tapered storage receptacle as described with respect to the embodiment of FIGS. 1, 2 and 4. Also, the hook member 124 is molded with a pair of laterally spaced spurs or prongs 136 for gripping the edge of a board, etc., and with a nail head slot 138 and a concave nail shank pocket 140 for retaining the hook 100 for measuring purposes as previously described with reference to the metal hook 52.

The hinge knuckles 125 have upstanding projections 146 and the base member 110 is formed with recessed shoulders 148 engageable by the projections 146 to provide stop means for establishing the unfolded position of the hook member 124. Also, the central hinge knuckle 119 of the base member 110 is formed with a pair of 90° angularly spaced notches 150, 151 (FIG. 7) and an intermediate shoulder 152. The hook section 130 is formed with a short upstanding tapered projection or detent 156 for receipt within the two notches 150, 151 in the folded and unfolded positions of the hook member 124. The intermediate shoulder 152 has a generally V-shape with inclined cam edges 158 engageable by a tapered edge 159 of the detent 156 to provide an "over-center" interference therebetween which assists in retaining the hook member 124 in its folded and unfolded detent position. Also, the hook section 130 is formed with a recess or pocket 160 for receiving the shoulder 152 when the hook member is unfolded. Accordingly, the hook member 124 is adapted to be manually pivoted between its unfolded and folded positions and with the upstanding detent 156 adapted to be received in the angularly spaced detent notches 150, 151 for retaining the hook in each position.

As will be apparent to persons skilled in the art, various modifications, adaptations and variations of the foregoing specific disclosure can be made without departing from the teachings of the present invention.

We claim:

1. In a tape measure having a molded plastic casing with separate casing sides with opposed laterally spaced sidewalls respectively, providing a measuring tape storage compartment therebetween and an edgewall extending at least partly around the edge of the spaced sidewalls to at least partly enclose the measuring tape storage compartment, a rotatable measuring tape reel extending between the spaced sidewalls for storing a coiled measuring tape blade within the storage compartment, an elongated measuring tape blade adapted to be manually withdrawn from the casing and having an inner end connected to the reel for coiling the tape blade onto the reel by rotation of the reel in one angular direction, and an enlarged measuring tape end grip at the outer end of the measuring tape blade, the tape measure having a measuring tape blade delivery throat with an outer opening in the casing edgewall for delivering the measuring tape blade to and withdrawing it from the reel, the improvement wherein the tape delivery throat comprises opposed laterally spaced elongated channels in the opposed sidewalls respectively, extending inwardly from said outer throat opening and forming a storage receptacle for slidably receiving the enlarged end grip laterally between the sidewalls of the casing and inwardly of said outer opening, the opposed channels being inclined inwardly laterally toward each other to define an end grip receptacle of laterally decreasing width and the enlarged end grip having an inwardly laterally decreasing width generally conforming to the inwardly decreasing width of the storage receptacle, the opposed sidewalls having laterally spaced outwardly facing abutment shoulders at the inner ends of the opposed channels respectively and the enlarged end grip having at the inner end thereof laterally spaced inwardly facing abutment shoulders laterally outwardly of the measuring tape engageable with the outwardly facing abutment shoulder of the casing respectively for seating the enlarged end grip in the storage receptacle.

2. A tape measure according to claim 1 wherein the laterally spaced abutment shoulder of the opposed casing sidewalls and end grip are respectively coplanar for face to face engagement.

3. A tape measure according to claim 1 further comprising a pair of laterally extending parallel guide rolls between the housing sidewalls for guiding the end grip into and out of the storage receptacle.

4. A tape measure according to claim 3 further comprising a second pair of laterally extending parallel guide rolls between the housing sidewalls on opposite sides of the measuring tape blade inwardly of the end grip storage receptacle for guiding the measuring tape blade as it is withdrawn from and coiled onto the tape reel.

5. A tape measure according to claim 1 wherein the casing sidewalls have opposed slots respectively at the outer ends of the opposed channels for manually gripping and withdrawing the enlarged end grip from the storage receptacle.

6. A tape measure according to claim 5 wherein the casing sidewalls have external recessed pocket portions on opposite sides of the slot to facilitate gripping and withdrawing the enlarged end grip from the storage receptacle.

7. A tape measure according to claim 1 whrein the enlarged end grip comprises a longitudinally extending generally flat molded plastic base member with an outer hinge section with laterally spaced longitudinally outwardly extending hinge knuckles and a generally D-shaped inner section with a transversely extending tape connector bar having a longitudinally inwardly projecting teardrop shape, the measuring tape blade having an outer end loop receiving the teardrop shaped bar for connecting the measuring tape to the base member, a generally L-shaped molded plastic hook member having a generally flat hook section and upstanding laterally spaced hinge knuckles at one end thereof interfitting with the hinge knuckles of the base member, the interfitting hinge knuckles of the base and hook members having aligned pivot pin apertures and a pivot pin received within the aligned apertures for mounting the hook member on the base member for pivotal movement between a folded position with the generally flat hook section underlying the generally flat base member and an unfolded position with the hook section extending generally perpendicular to the base member to form a generally L-shaped hook therewith, said hook section and base member hinge section being molded with integral detent means for detenting the hook member in its folded and unfolded positions, the detent means comprising angularly spaced detent notches and an intermediate angularly extending integral shoulder on the outer longitudinal end of the base member hinge section and an integral upstanding detent projection at said one end of the hook section receivable in the notches in the folded and unfolded positions of the hook member respectively and having interference engagement with said intermediate shoulder as the hook member is pivoted between said positions.

8. In a tape measure having a casing with spaced sidewalls providing a measuring tape storage compartment therebetween and an edgewall extending at least partly around the edge of the spaced sidewalls to at least partly enclose the measuring tape storge compartment, a rotatable measuring tape reel extending between the spaced sidewalls for storing a measuring tape blade within the storage compartment, an elongated measuring tape blade adapted to be manually withdrawn from the casing and having an inner end connected to the reel for coiling the blade onto the reel by rotation of the reel and an enlarged tape end grip at the outer end of the measuring tape blade, the tape measure having a measuring tape delivery throat with an opening in the casing edgewall for delivering the measuring tape to and withdrawing it from the reel, the improvement wherein the enlarged tape end grip comprises a longitudinally extending generally flat molded plastic base member with an outer hinge section with laterally spaced longitudinally outwardly extending hinge knuckles and an inner transversely extending tape connector bar, the measuring tape having an outer end loop receiving the connector bar for connecting the measuring tape to the base member, a generally L-shaped molded plastic hook member having a generally flat hook section and an upstanding hinge section at one end thereof with upstanding laterally spaced hinge knuckles interfitting with the hinge knuckles of the base member, the interfitting hinge knuckles of the base and hook members having aligned pivot pin apertures and a pivot pin received therein for mounting the hook members on the base member for pivotal movement between a folded position with the generally flat hook section underlying the generally flat base member and an unfolded position with the hook section extending generally perpendicular to the base member to form therewith a generally L-shaped hook, said hook section and base member hinge section being molded with detent means for detenting the hook member in its folded and unfolded positions and with cooperating stop means on the base member hinge section and hook member knuckles establishing the unfolded position of the hook member, the detent means comprising angularly spaced detent notches and an intermediate angularly extending integral shoulder on the outer longitudinal end of one of the hinge knuckles of the base member hinge section and an integral upstanding detent projection at said one end of the hook section receivable in the notches in the folded and unfolded positions of the hook member respectively and having interference engagement with said intermediate shoulder as the hook member is pivoted between said positions.

* * * * *

UNITED STATES PATENT AND TRADEMARK OFFICE
CERTIFICATE OF CORRECTION

PATENT NO. : 4,164,334
DATED : August 14, 1979
INVENTOR(S) : Richard H. Rathbun & William J. Hildebrandt It is certified that error appears in the above-identified patent and that said Letters Patent are hereby corrected as shown below:

Column 1, Line 60, "Fig." should read --Figs.--.

Column 3, Line 34, "mount" should read --mouth--.

Column 3, Line 43, "of" first occurrence should read --on--.

Column 3, Line 66, "look" should read --loop--.

Column 5, Line 33, (claim 1) "shoulder" should read --shoulders--.

Column 5, Line 37, (claim 2) "shoulder" should read --shoulders--.

Column 5, Line 58, (claim 6) "slot" should read --slots--.

Column 5, Line 61, (claim 7) "whrein" should read --wherein--.

Column 6, Line 58, (claim 8) "members" should read --member--.

Signed and Sealed this

Fourth Day of December 1979

[SEAL]

Attest:

SIDNEY A. DIAMOND

Attesting Officer    Commissioner of Patents and Trademarks